United States Patent
McLean et al.

(10) Patent No.: US 10,670,156 B2
(45) Date of Patent: Jun. 2, 2020

(54) INSERT CHECK VALVES AND METHODS

(71) Applicant: Titan Flow Control, Inc., Lumberton, NC (US)

(72) Inventors: Geoffrey Walton McLean, Lumberton, NC (US); Anthony David Cabral, Lumberton, NC (US); Younes Labdouni, Raeford, NC (US)

(73) Assignee: Titan Flow Control, Inc., Lumberton, NC (US)

( * ) Notice: Subject to any disclaimer, the term of this patent is extended or adjusted under 35 U.S.C. 154(b) by 30 days.

(21) Appl. No.: 16/008,307

(22) Filed: Jun. 14, 2018

(65) Prior Publication Data
US 2019/0383407 A1    Dec. 19, 2019

(51) Int. Cl.
*F16K 15/02*    (2006.01)

(52) U.S. Cl.
CPC .......... *F16K 15/028* (2013.01); *F16K 15/023* (2013.01)

(58) Field of Classification Search
CPC ..... F16K 15/023; F16K 15/025; F16K 15/028
USPC .......... 137/543, 542, 533.21, 533.25, 533.19
See application file for complete search history.

(56) References Cited

U.S. PATENT DOCUMENTS

| | | | | |
|---|---|---|---|---|
| 2,943,639 A | * | 7/1960 | Smith | F16K 15/063 137/515.7 |
| 4,862,913 A | * | 9/1989 | Wildfang | F16K 15/063 137/543 |
| 4,977,924 A | * | 12/1990 | Scaramucci | F16K 15/03 137/454.2 |
| 6,695,007 B2 | * | 2/2004 | Vicars | F16K 15/063 137/516.29 |
| 9,506,576 B2 | * | 11/2016 | Desai | F16K 15/063 |

* cited by examiner

*Primary Examiner* — Kevin L Lee
(74) *Attorney, Agent, or Firm* — Jenkins, Wilson, Taylor & Hunt, P.A.

(57) ABSTRACT

Inlet check valves and methods can include a seat body, a movable disc, a spring, and a disc retention cage. The disc retention cage captures the movable disc to the seat body through retention elements, which engage in a groove circumferentially disposed around a flange of the seat body. The movable disc has a stem on the outlet side, which guides the movement of the disc by engaging with a through-hole in the disc retention cage. A compression spring maintains the movable disc in a normally closed position against the seat body.

24 Claims, 15 Drawing Sheets

US 10,670,156 B2

INSERT CHECK VALVES AND METHODS

TECHNICAL FIELD

The present subject matter relates generally to valves for use in fluid flow applications. More particularly, the subject matter disclosed herein relates to check valve designs.

BACKGROUND

A check valve is generally referred to as a valve that allows fluid (i.e., liquid or gas) to flow through it in only one direction. Common designs for check valves can include a movable portion, such as a disc or a ball, and a stationary portion that is in connection with the flow path. When sufficient pressure is applied to the inlet, the movable portion can be unseated so that fluid can flow past the movable portion and through the valve. If higher pressure develops on the downstream side, or if fluid flow stops, the movable portion is pressed against the inlet by a spring device to prevent reverse fluid flow.

An insert check valve is a type of check valve that is designed to be positioned between two pipe flanges without the use of a valve body. Insert valves typically include a circular body or "seat", which is held stationary between the pipe flanges, and a smaller, movable disc that is captured by the seat such that it can open and close with fluid flow. Although there are many types of insert check valves available today, their popularity supports an ongoing need for improvements, for example to features such as sealing and flow properties, response time, weight, cost, and ease of assembly.

SUMMARY

An insert check valve according to the disclosure herein provides advantages over conventional insert check valves. An insert check valve can be constructed such that it is easy to assemble and disassemble, as well as allowing minimal parts, reduced weight, low flow obstruction, and a high flow coefficient.

In one aspect, an insert check valve can have a seat body; a movable disc with an integral stem; a disc retention cage; a compression spring; and a plurality of retention elements. The disc retention cage is connected to the seat body by attaching the retention elements to a groove in the seat body.

BRIEF DESCRIPTION OF THE DRAWINGS

A full and enabling disclosure of the present subject matter is set forth more particularly in the remainder of the specification, including reference to the accompanying figures (also, "Figs."), relating to one or more non-limiting example embodiments, in which.

DETAILED DESCRIPTION

Figure 1A:
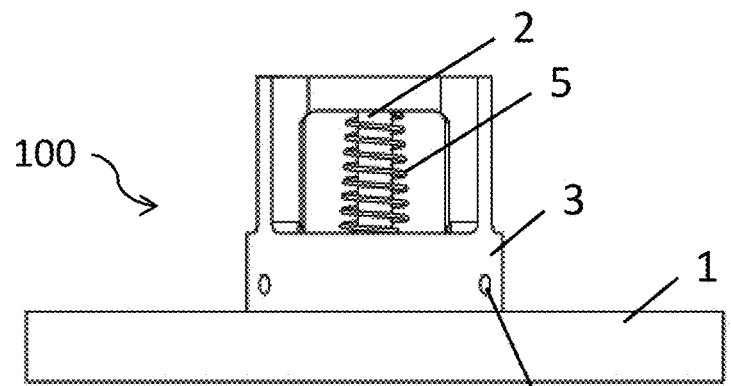
FIG. 1A is a front assembly view of an embodiment of an insert check valve as disclosed herein.
Figure 1B:
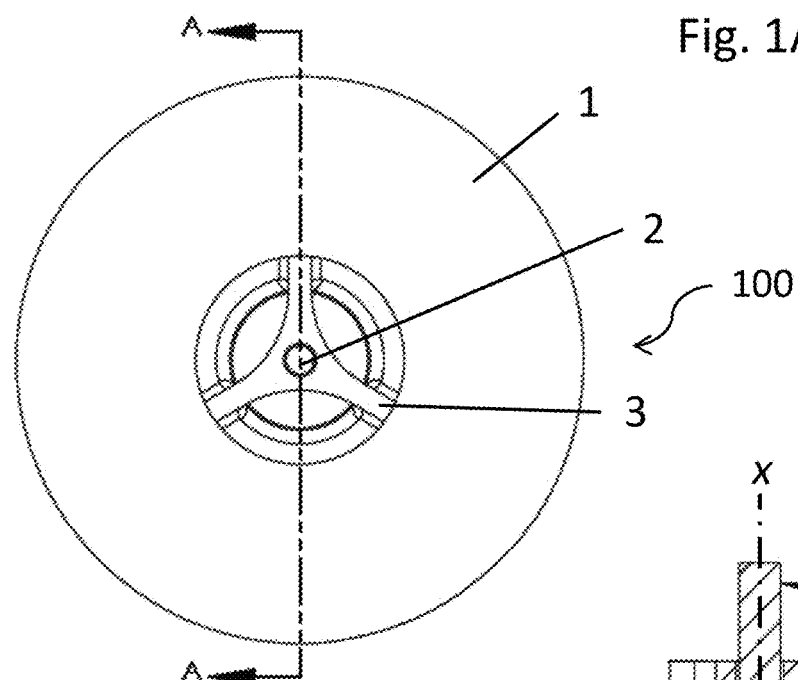
FIG. 1B is a top view of an embodiment of an insert check valve as disclosed herein.
Figure 1C:
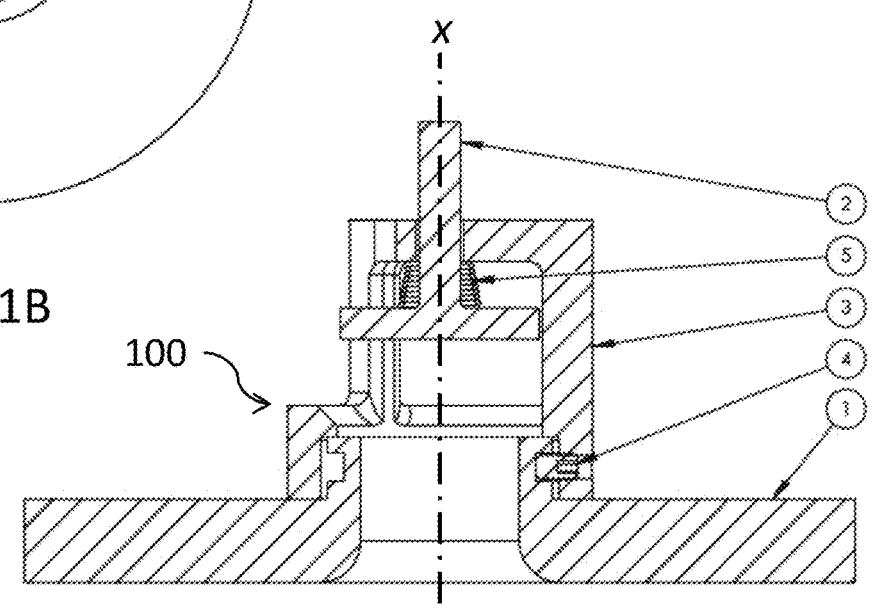
FIG. 1C is a cross-sectional side view through section A-A of FIG. 1B.

FIGS. 1A-1C depict an example embodiment of an insert check valve, generally designated 100. FIGS. 1A and 1B are a front and top view of insert check valve 100, respectively, while FIG. 1C is a cross-sectional view of insert check valve 100 through section A-A. Insert check valve 100 comprises a seat body 1, a movable disc 2, a disc retention part, a cage 3, retention elements 4, and a compression spring 5. A longitudinal axis x passes through the center of insert check valve 100.

As illustrated in FIG. 1B, seat body 1 is substantially round, although other shapes can also be envisioned for us in some embodiments (i.e., any suitable shape for incorporating within a pipe). Seat body 1 can be sized such that it can be clamped between two flanges of a fluid (e.g., liquid or gas) pipe. Insert check valve 100 can have an outermost dimension that is larger than an internal flow diameter of a pipe. In some embodiments, seat body 1 is smaller than a pipe flange bolt circle dimension, thus eliminating the requirement for additional mounting features. However, it is also possible for seat body 1 to have mounting and/or attachment features incorporated into the shape.

As also illustrated in FIGS. 1B-1C, insert check valve 100 is configured such that disc 2 is captured onto seat body 1 by cage 3. Disc 2 can move within cage 3. Cage 3 is retained onto seat body 1 by retention elements 4, which are located in a plane transverse to axis x. Spring 5 is located between disc 2 and cage 3 and is arranged such that disc 2 is normally resting against a face of seat body 1. As a fluid pressure increases on an upstream face of disc 2, spring 5 compresses and moves disc 2 away from seat body 1 into an open position. FIG. 1A illustrates insert check valve 100 in a closed position, while FIG. 1C illustrates insert check valve 100 in an example open position.

One method by which insert check valve 100 minimizes pressure loss across the valve is by controlling the geometry of the components. For example, increasing the travel length of disc 2 increases the open area on the downstream side of the valve and thus also increases the flow coefficient, Cv. The flow coefficient is additionally improved by minimizing the area obstructed by cage 3 as well as controlling the geometry of cage 3.

Figure 2:
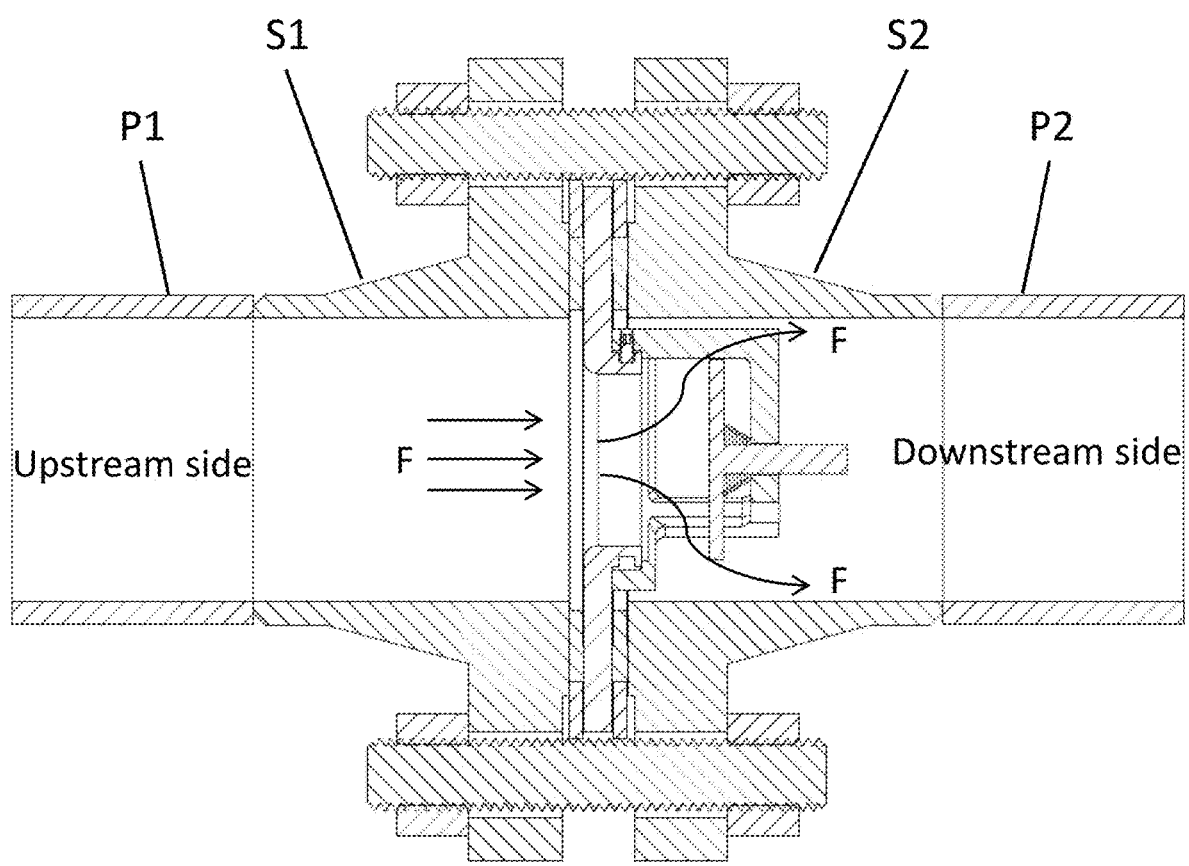
FIG. 2 is an cross-sectional view of an of an insert check valve as disclosed herein installed in a pipe.

FIG. 2 illustrates an example embodiment of insert check valve 100 assembled into a piping system. Insert check valve 100 is shown in the open position. In the example shown, insert check valve 100 is mounted between modular sections S1 and S2, which are disposed between pipe ends P1 and P2. S1 and S2 are then connected together in any suitable manner. One typical method of connecting pipe flanges is via bolts arranged in a circular pattern around the flange. Insert check valve 100 can be pre-installed into modular sections S1 and S2 (also known as a pipe spool), and the sections can be subsequently installed into a piping system. This eliminates the need to separate (i.e., jack apart) the larger pipe system. Insert check valve 100 can be attached by simply capturing it between the mounting flanges of S1 and S2. Alternatively, in some embodiments insert check valve 100 can be mounted directly between pipe ends P1 and P2.

Insert check valve 100 is oriented so that disc 2 and cage 3 are located on the downstream, or outlet, side of fluid flow F. In keeping with conventional check valves, insert check valve 100 is configured such that fluid is permitted to flow in only the downstream direction. Insert check valve 100 is configured to be normally closed. Spring 5 presses disc 2 against seat body 1 when the fluid pressure is below a prescribed threshold. When fluid pressure on disc 2 rises above the prescribed threshold pressure, the normal force on the upstream face of disc 2 exceeds the resistance force of spring 5, causing disc 2 to unseat from seat body 1 and allowing fluid to flow from the upstream, or inlet, side to the outlet side.

Figure 3A:
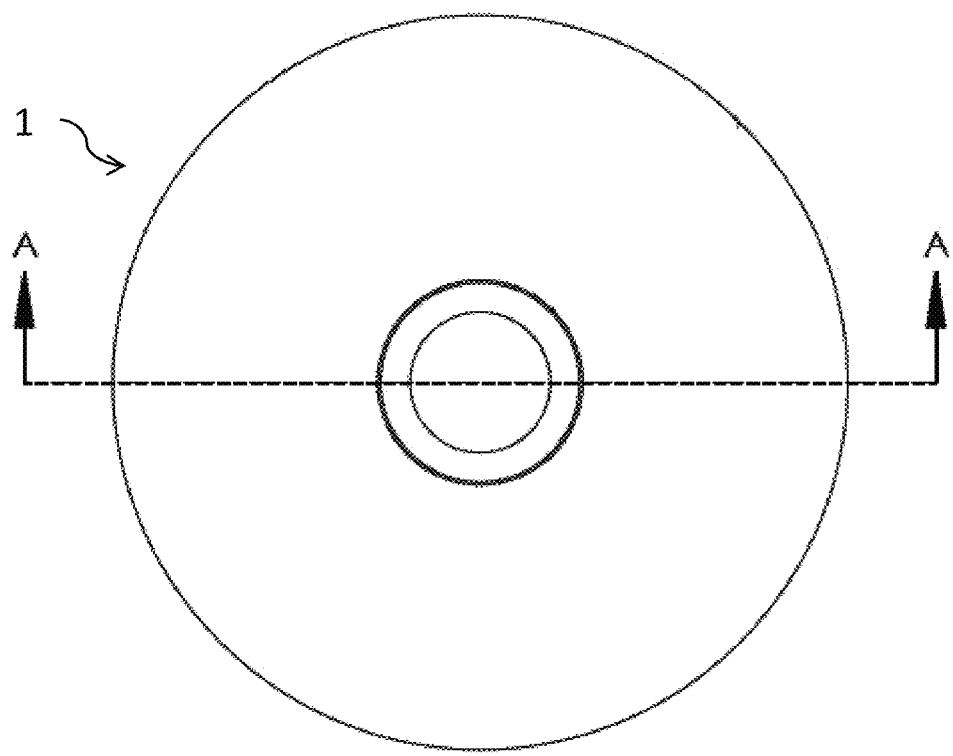
FIG. 3A is a top view of a seat body of an insert check valve as disclosed herein.
Figure 3B:
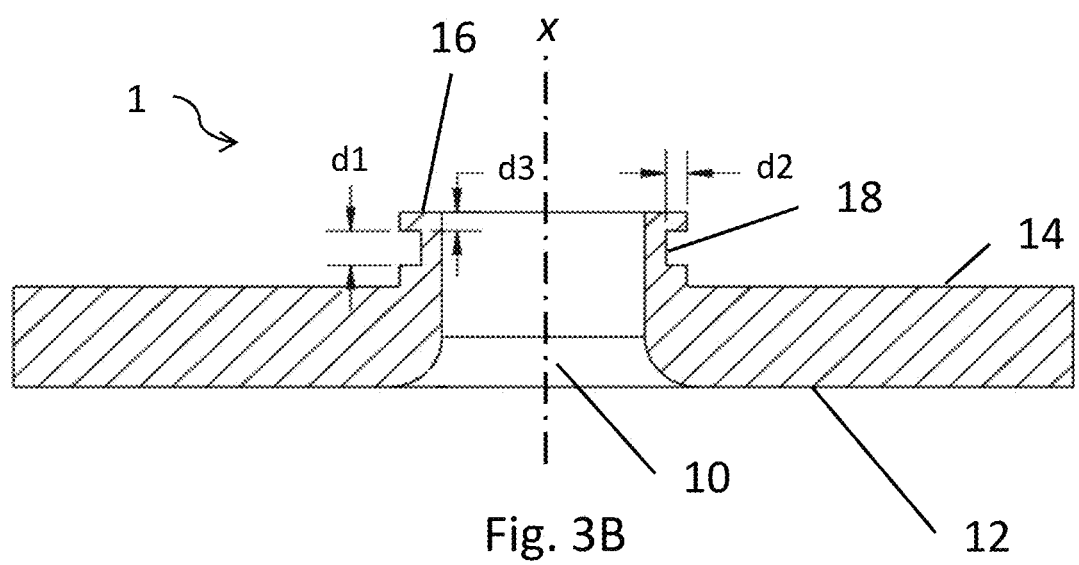
FIG. 3B is a cross-sectional view through section A-A of FIG. 3A.

FIGS. 3A-3B depict an example embodiment of seat body 1 in further detail. FIG. 3A is a top view of seat body 1, and FIG. 3B is a cross-sectional view of FIG. 3A through A-A. Seat body 1 has a central opening 10, which is located concentrically with longitudinal axis x. In the example embodiment shown, seat body 1 and central opening 10 are circular in shape. When insert check valve 100 is in an open position, the disc 2 is not sealed against the seat body and fluid flows from an inlet side 12 to an outlet side 14 of seat body 1. Central opening 10 can have a filleted or other profiled inlet edge to affect the fluid flow pattern. When insert check valve 100 is in a closed position, fluid is prevented from flowing from outlet side 14 to inlet side 12. Disposed on outlet side 14 is a flange 16, which is also aligned concentrically with longitudinal axis x. Flange 16 also comprises a groove, or recess, 18. Groove 18 is located in a plane perpendicular to longitudinal axis x. It can be provided as a full circumferential recess, or it can be formed in segmented regions of flange 16. The purpose of groove 18 is to provide a transverse mounting location for retention elements 4. Groove 18 is defined by a width d1 and a depth d2, which can be varied according to the design requirements. Additionally, groove 18 is located a distance d3 away from the downstream face of flange 16 to provide sufficient strength and material thickness to prevent deformation of seat body 1.

Figure 4:
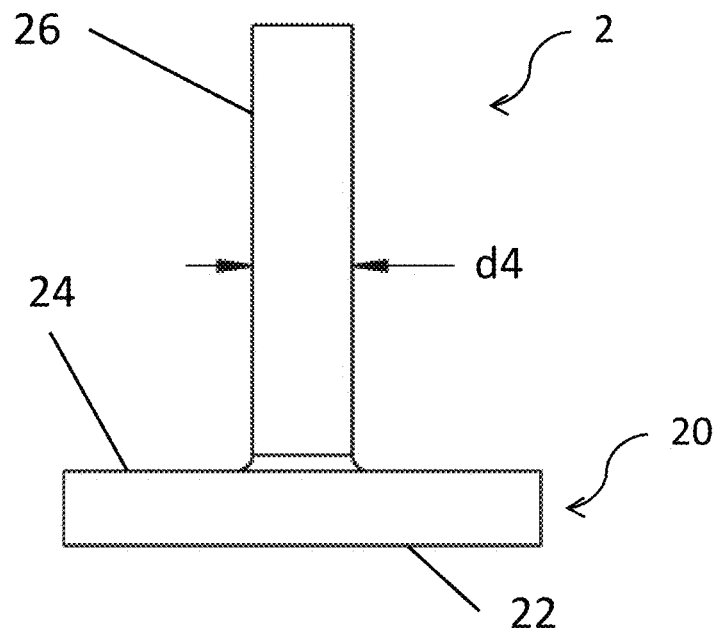
FIG. 4 is a detailed view of a movable disc of an insert check valve as disclosed herein.

Referring to FIG. 4, details of an example embodiment of movable disc 2 are shown. Disc 2 has a disc portion 20 with an inlet face 22 and an outlet face 24, and additionally a stem 26, which is integrally formed with disc portion 20. Disc portion 20 can be sized such that it mates with a downstream face of flange 16 (i.e., in a plane transverse to the direction of fluid flow). The diameter of disc portion 20 can be approximately equal to or slightly smaller than the diameter of flange 16 (see, FIG. 3B). Disc 2 has an overall height so that stem 26 at least partially engages with cage 3 when insert check valve 100 is assembled in a closed position. Stem 26 has a diameter d4 that is smaller than a corresponding hole in cage 3 (see, e.g., 36).

Figure 5A:
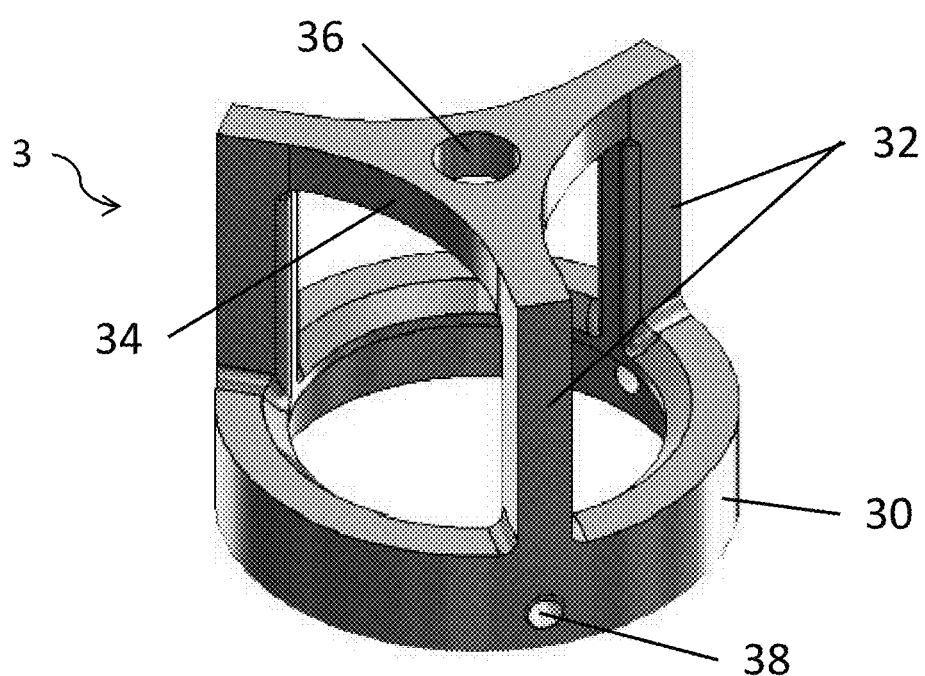
FIG. 5A is an isometric view of a disc retention cage of an insert check valve as disclosed herein.
Figure 5B:
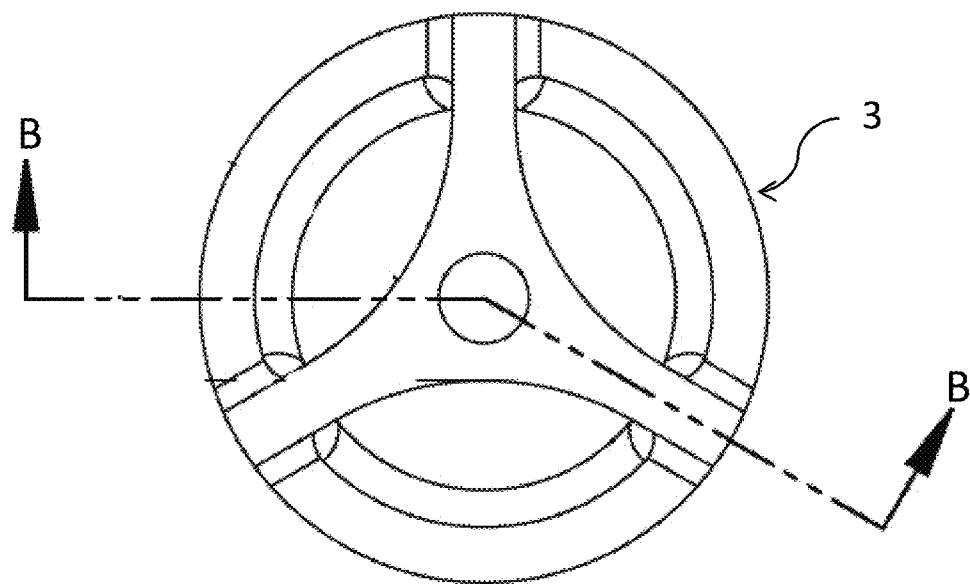
FIG. 5B is a top view of a disc retention cage of an insert check valve as disclosed herein.
Figure 5C:
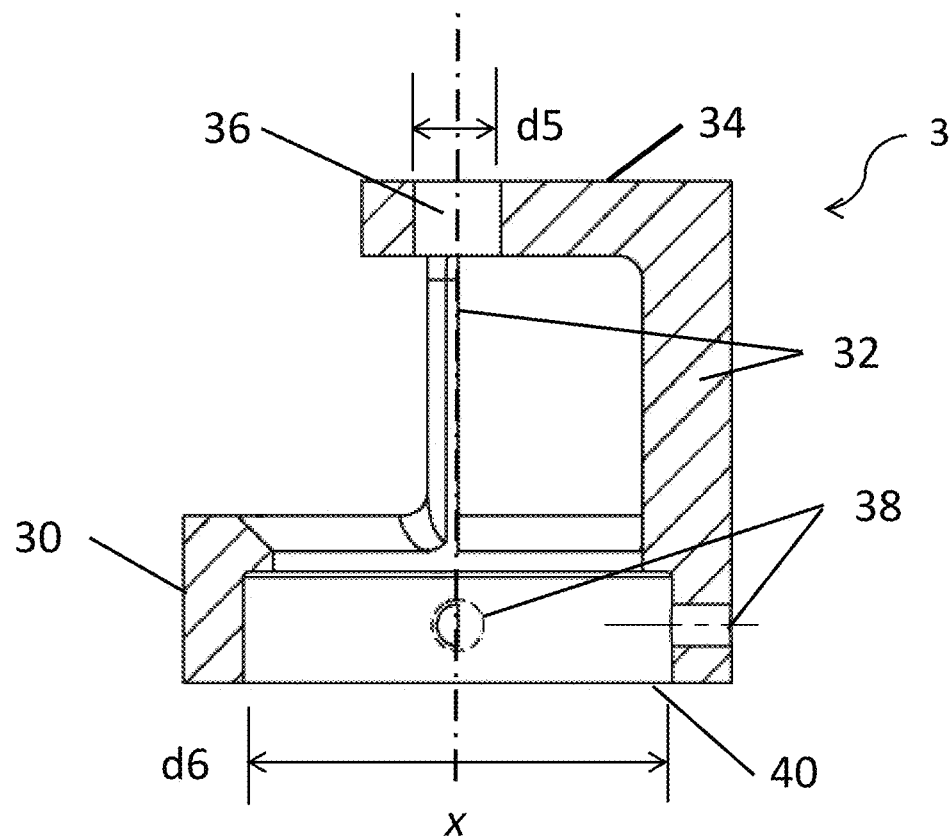
FIG. 5C is a cross-sectional view of a view through section B-B of FIG. 5B.

FIGS. 5A-5C illustrate details of an example embodiment of cage 3. FIG. 5A is an isometric view of cage 3. Cage 3 includes a ring portion 30, a central portion made up of vertical supports, or columns, 32, and a web portion 34. Ring portion 30 is a "lower" (as seen in FIG. 5A), or inlet, portion of cage 3 and is a generally cylindrically-shaped section. Ring portion 30 additionally includes threaded holes 38, which are distributed radially on axes perpendicular to the direction of fluid flow. Cage 3 comprises a plurality of threaded holes 38, which can be disposed in line with columns 32, or offset therefrom. Threaded holes 38 are configured to accept retention elements 4.

Columns 32 are attached at one end to ring portion 30 and extend substantially parallel to the longitudinal axis x (see, e.g., FIG. 5C). Columns 32 can be formed with rounded inner edges to assist in improving flow around the structure. The inner surfaces of columns 32 can be located on a virtual diameter approximately equal to or slightly larger than an outer diameter of disc 2. One measure of the obstructed area on the outlet side of insert check valve 100 is the width of the columns compared to the circumference of disc 2. The transverse width of the columns (i.e., an arc length along a virtual inside diameter of cage 3) can be summed together to represent a total blocked width. Similarly, the outside diameter of disc 2 can be used to calculate a circumferential length, which corresponds to an available flow "width". The blocked width of insert check valve 100 can, for example, be less than 17% of the available flow width, or circumference, of disc 2. In some embodiments the blocked width can be less than 10% of the flow width. This calculation also holds true when comparing cylindrical areas transverse to the overall flow direction. The total area of the inner faces of the columns can be less than 17% of a virtual cylinder calculated using the diameter of disc 2 and the height of the opening between disc 2 and seat body 1.

At the opposite end of ring portion 30, columns 32 are joined together by web portion 34. Web portion 34 is substantially orthogonal to longitudinal axis x and comprises at least one "arm" (i.e., radial portion) for each column 34. Web portion 34 has a profile that is optimized to reduce weight and resistance to fluid flow, while maintaining adequate mechanical strength. By minimizing the area of web portion 34, disc 2 has an improved response to any flow reversal. Web portion 34 also includes a through-hole 36, which is centered in the web and aligned with longitudinal axis x.

FIG. 5B is a top view of cage 3, and FIG. 5C is a cross-sectional view of FIG. 5B through section B-B. As best seen in FIG. 5C, ring portion 30 can have an inner diameter d6 that is approximately equal to or slightly larger than an outer diameter of flange 16, so that cage 3 can be positioned around flange 16 and attached to groove 18 via retention elements 4. An upstream end face 40 mates against the outlet face 14 of seat body 1. On the "upper" end (as seen in FIG. 5C), or outlet, side of cage 3, through-hole 36 is disposed at the center of web 34. Through-hole 36 is sized to be slightly larger than the diameter d4 of stem 26, so that disc 2 can slide freely through cage 3.

Retention elements 4 (not shown) can be, for example, socket-head set screws. However, it is also to be understood that alternative approaches to retaining cage 3 to seat body 1 can be envisioned without departing from the spirit of the disclosure. For example, threaded holes 38 can be replaced by any suitable retention feature for providing transverse connection to groove 18, such as through-holes, keyed holes, countersunk holes, etc. Likewise, retention elements 4 can comprise any suitable fastening or retention element, such as pins, bolts, screws, etc.

Figure 6:
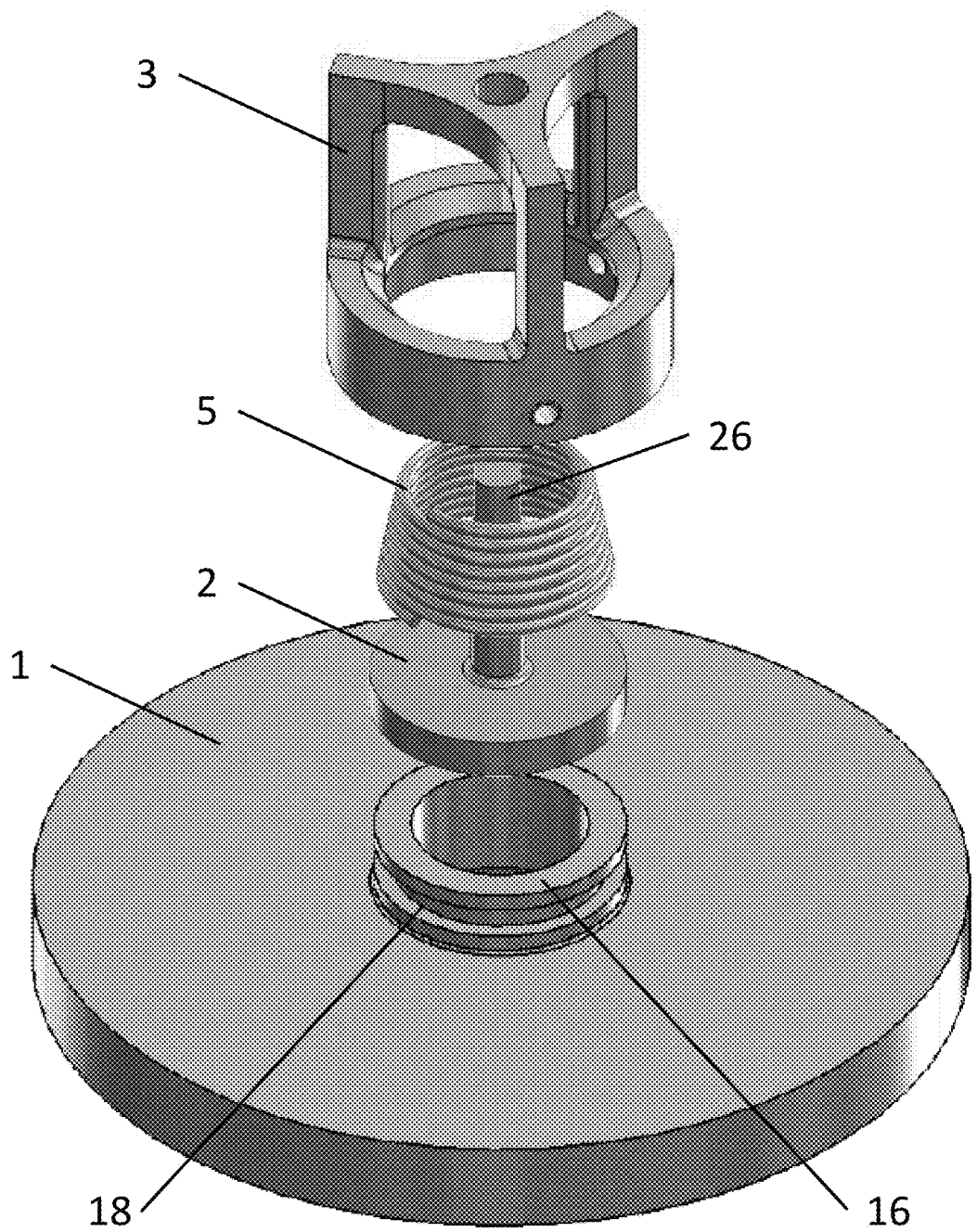
FIG. 6 is an exploded assembly view of an embodiment of an insert check valve as disclosed herein.
Figure 7A:
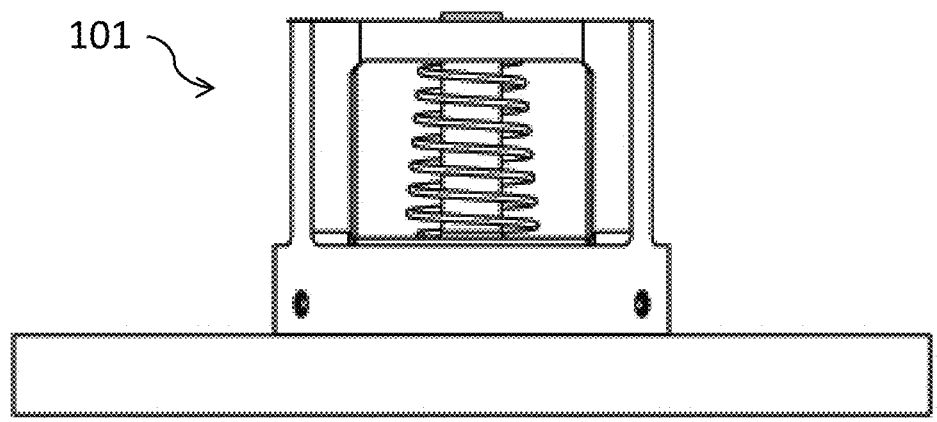
FIG. 7A is a side view of a further embodiment of an insert check valve as disclosed herein.
Figure 7B:
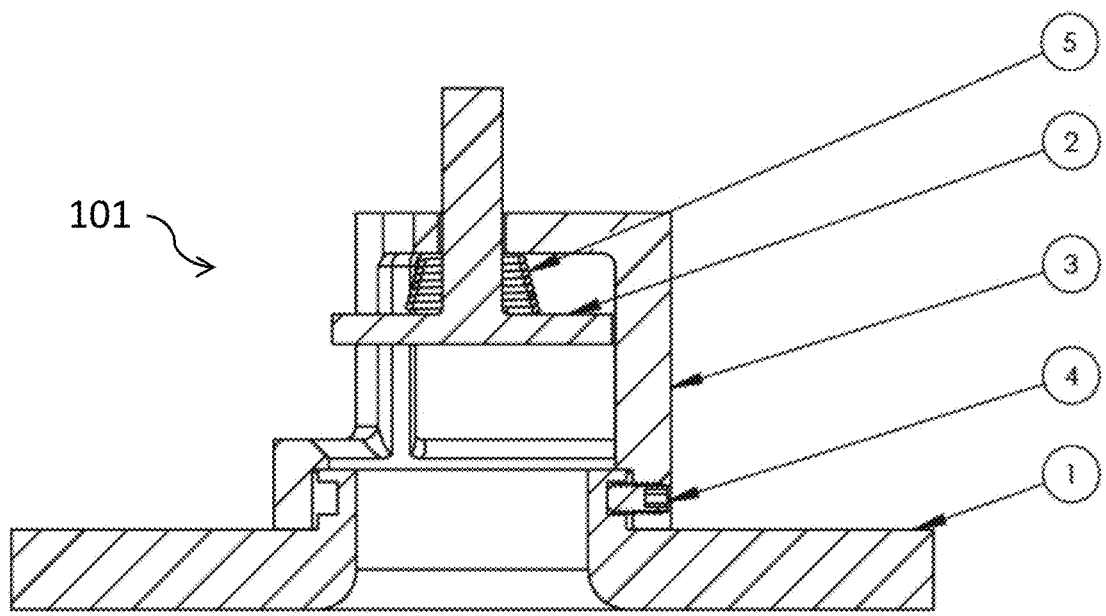
FIG. 7B is a cross-sectional view of the embodiment of FIG. 7A.
Figure 8A:
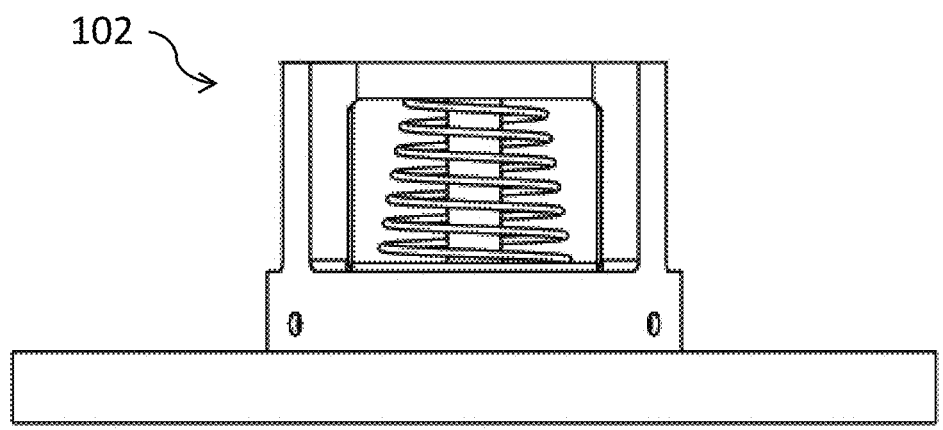
FIG. 8A is a side view of a further embodiment of an insert check valve as disclosed herein.
Figure 8B:
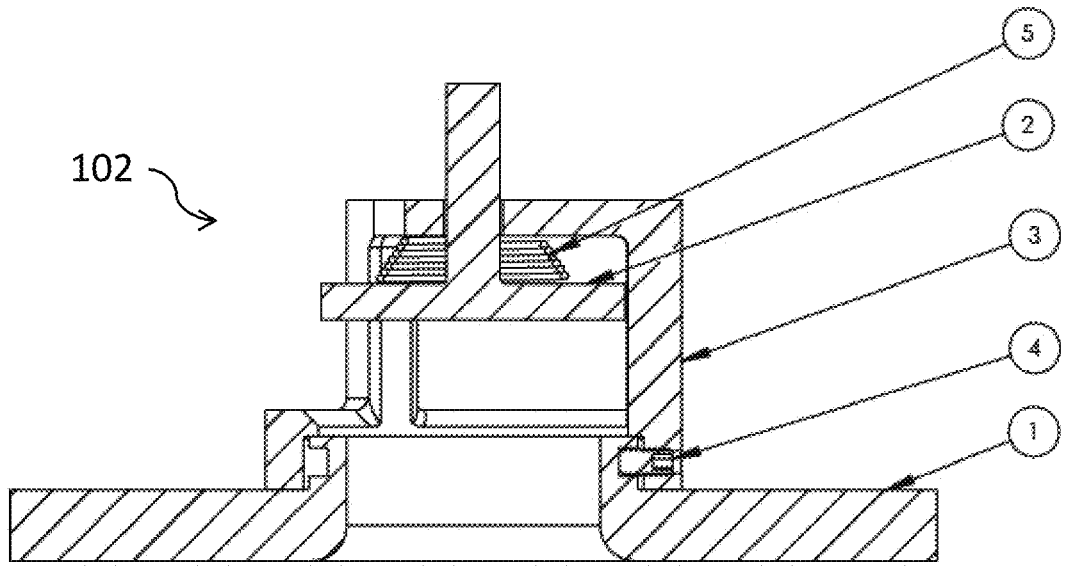
FIG. 8B is a cross-sectional view of the embodiment of FIG. 8A.
Figure 9A:
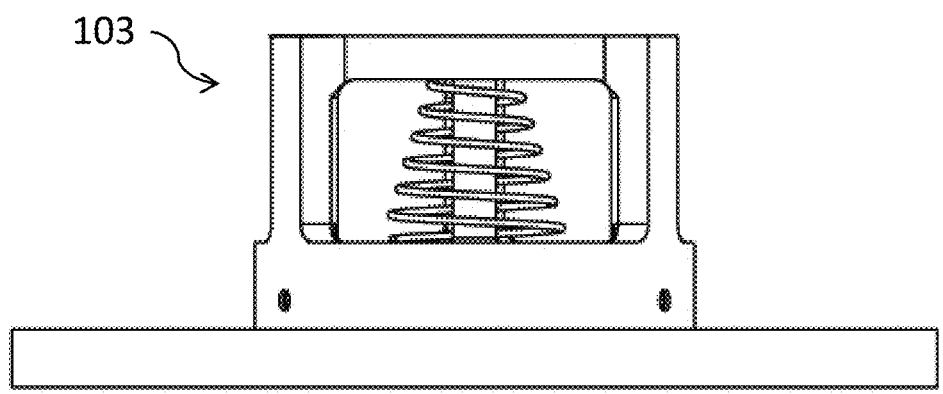
FIG. 9A is a side view of a further embodiment of an insert check valve as disclosed herein.
Figure 9B:
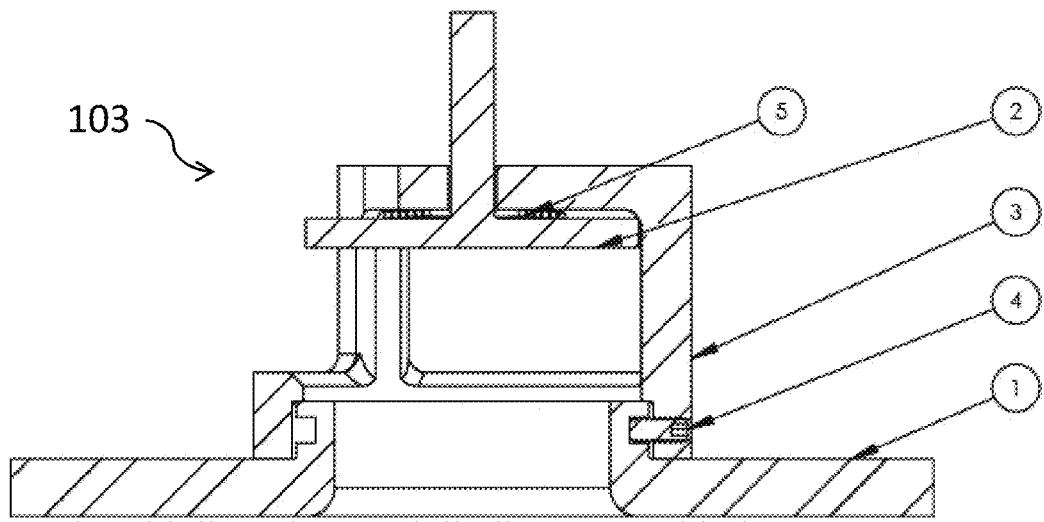
FIG. 9B is a cross-sectional view of the embodiment of FIG. 9A.
Figure 10A:
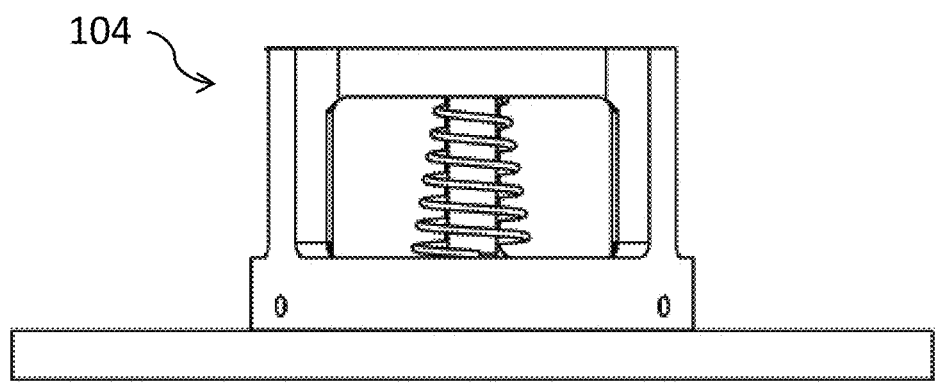
FIG. 10A is a side view of a further embodiment of an insert check valve as disclosed herein.
Figure 10B:
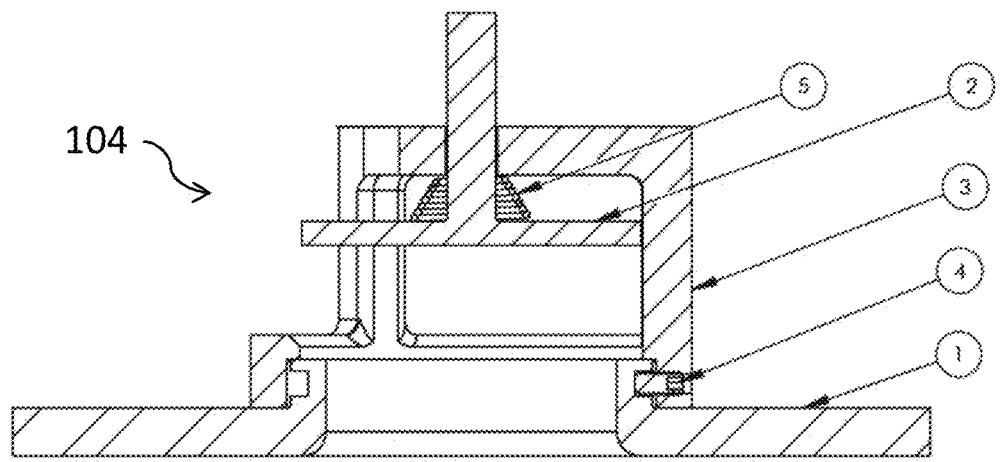
FIG. 10B is a cross-sectional view of the embodiment of FIG. 10A.
Figure 11A:
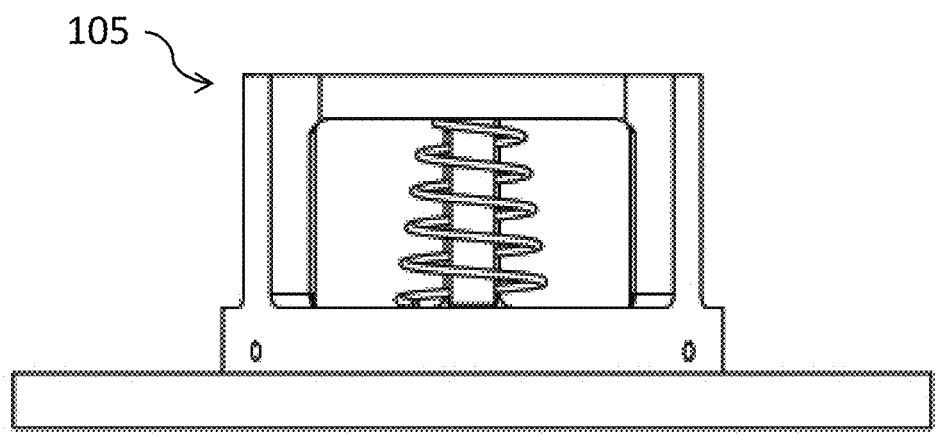
FIG. 11A is a side view of a further embodiment of an insert check valve as disclosed herein.
Figure 11B:
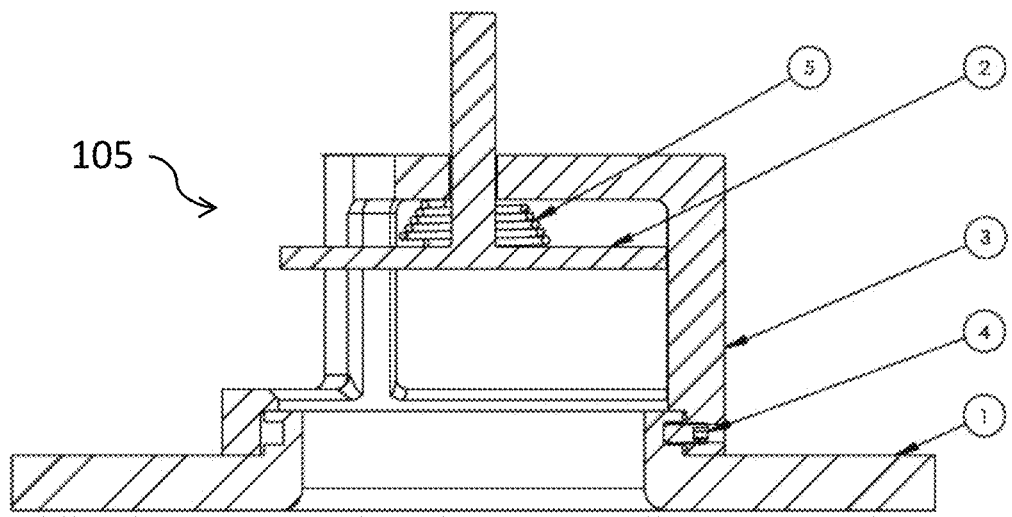
FIG. 11B is a cross-sectional view of the embodiment of FIG. 11A.
Figure 12A:
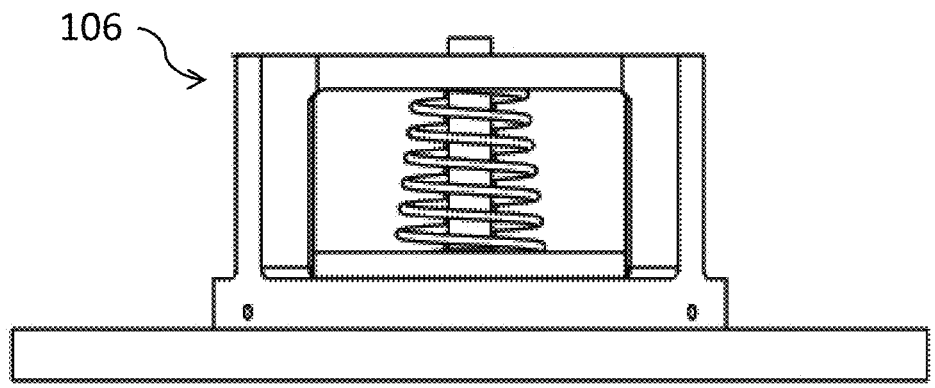
FIG. 12A is a side view of a further embodiment of an insert check valve as disclosed herein.
Figure 12B:
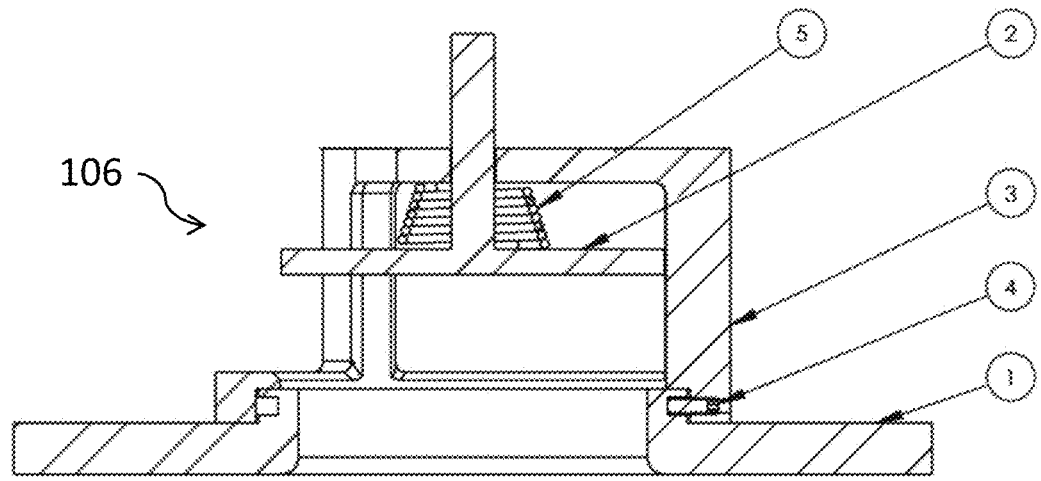
FIG. 12B is a cross-sectional view of the embodiment of FIG. 12A.
Figure 13A:
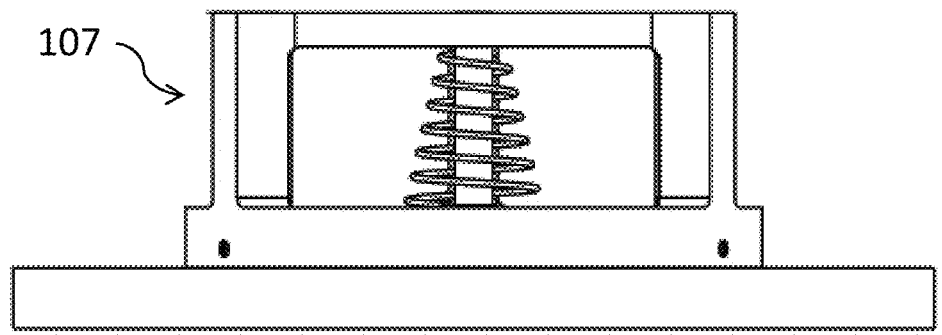
FIG. 13A is a side view of a further embodiment of an insert check valve as disclosed herein.
Figure 13B:
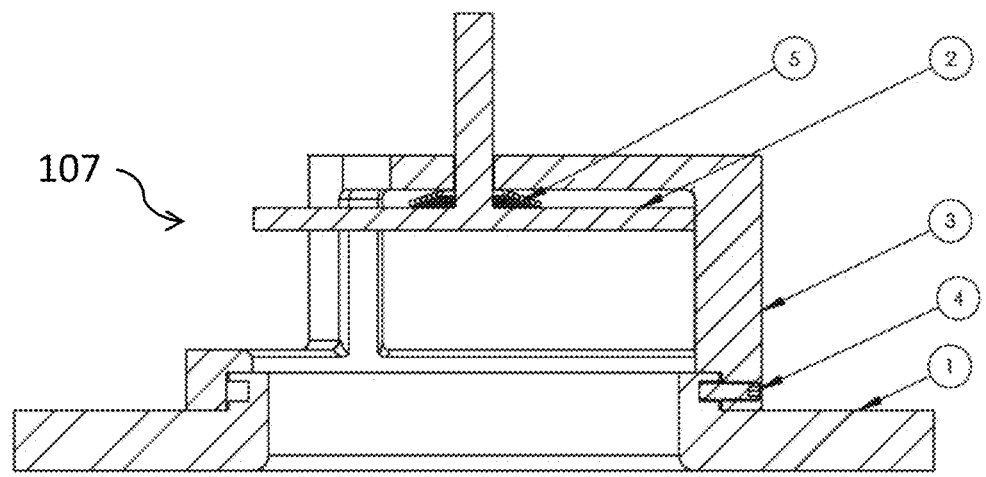
FIG. 13B is a cross-sectional view of the embodiment of FIG. 13A.
Figure 14A:
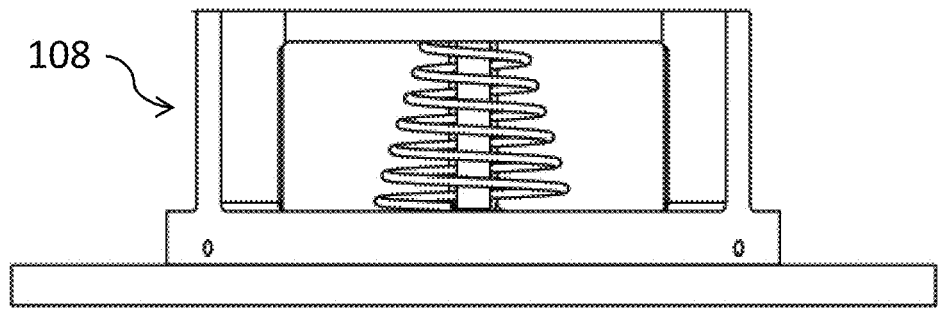
FIG. 14A is a side view of a further embodiment of an insert check valve as disclosed herein.
Figure 14B:
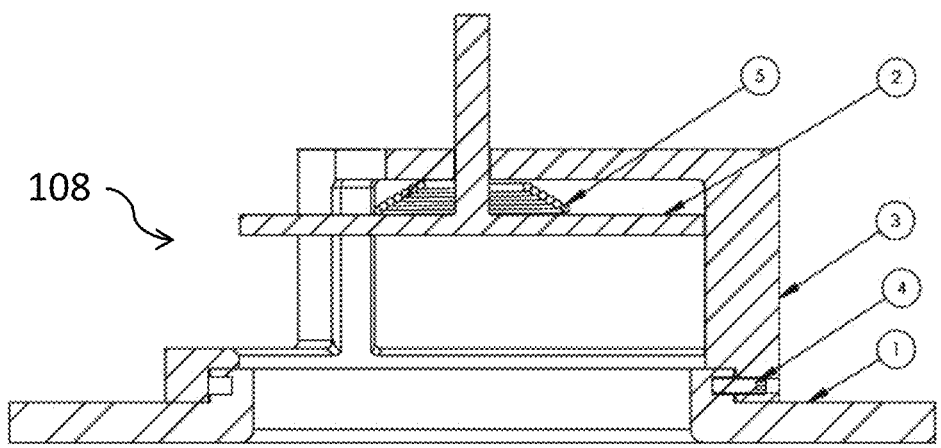
FIG. 14B is a cross-sectional view of the embodiment of FIG. 14A.

FIG. 6 is an exploded assembly view of an example embodiment of insert check valve 100. Assembly of insert check valve 100 is accomplished by first placing seat body 1 on a stable surface. Disc 2 is then placed onto flange 16 so that inlet face 22 (see, e.g., FIG. 2) rests on flange 16. Spring 5 is next placed over stem 26 of disc 2.

Cage 3 is then placed over disc 2. Retention elements 4 (not shown, see, e.g., FIG. 1C) can be partially pre-assembled into cage 3 such that retention elements 4 are not protruding through the inner surface of ring portion 30. Cage 3 is pressed downward (as seen in FIG. 6), compressing spring 5 and bringing upstream end face 40 of cage 3 into contact with outlet face 14 of seat body 1. While maintaining downward pressure, each retention element 4 is tightened against the base of groove 18. In this manner insert check valve 100 is simply and easily assembled using non-specialized tools.

One advantage of an insert check valve as disclosed herein is the low pressure drop sustained through the valve during operation. This is achieved by minimizing the material used, particularly in the design of cage 3. For example, web portion 34 is formed to minimize the obstructed area in a direction transverse to flow. The "spokes" of the web are approximately the same width as the columns 32, and the central area around through-hole 36 is formed to minimize material while maintaining adequate load strength. In some embodiments web portion 34 has a transverse area less than or equal to 30% of the cross-sectional area available for fluid flow through the cage (i.e., approximately equal to the inside diameter of the ring portion).

In some embodiments, cage 3 also reduces pressure drop by minimizing the material in the direction of fluid flow (i.e., longitudinally). The width of columns 32 can be minimized, and a minimum number of columns can be used. For example, consider an area of a column projected radially onto a cylindrical area representing the outer diameter of the cage, with a longitudinal length equal to the distance from the top of ring portion 30 to the bottom of web portion 34. The sum of the areas occupied by each column can be less than or equal to 25% of this total cylindrical area.

FIGS. 7A-14B depict additional example embodiments of insert check valve 100, generally designated 101-108. For each set of Figures A and B, Figure A is a front assembly view of the example embodiment, and Figure B is a cross-sectional view of the assembly as seen from a side view (comparable to section A-A of FIG. 1B). Each Figure A depicts the insert check valve in a closed position with disc 2 sealed against seat body 1, and each Figure B depicts the insert check valve in an open position with spring 5 substantially fully compressed. Insert check valves 101-108 are configured in the same way as insert check valve 100 but can have components and dimensions that are optimized for the required parameters for which each is designed. For example, insert check valves 101-108 can be configured to fit various internal pipe diameters or to sustain various fluid pressures and/or flow rates. Some non-limiting examples of possible pipe sizes are National Pipe Size (NPS) 1", 1.25", 1.5", 2", 2.5", 3", 4", 5", and 6".

Similarly, the materials for the components of insert check valve 100 can be selected to meet design requirements such as fluid reactivity. Insert check valve 100 can be used in chemical industry applications, for example, which may suggest particular metals or material alloys. Likewise, spring 5 can have varying height, spring force, shape, material type, coil diameter, etc. as required to meet the particular needs of a given environment.

Figure 15:
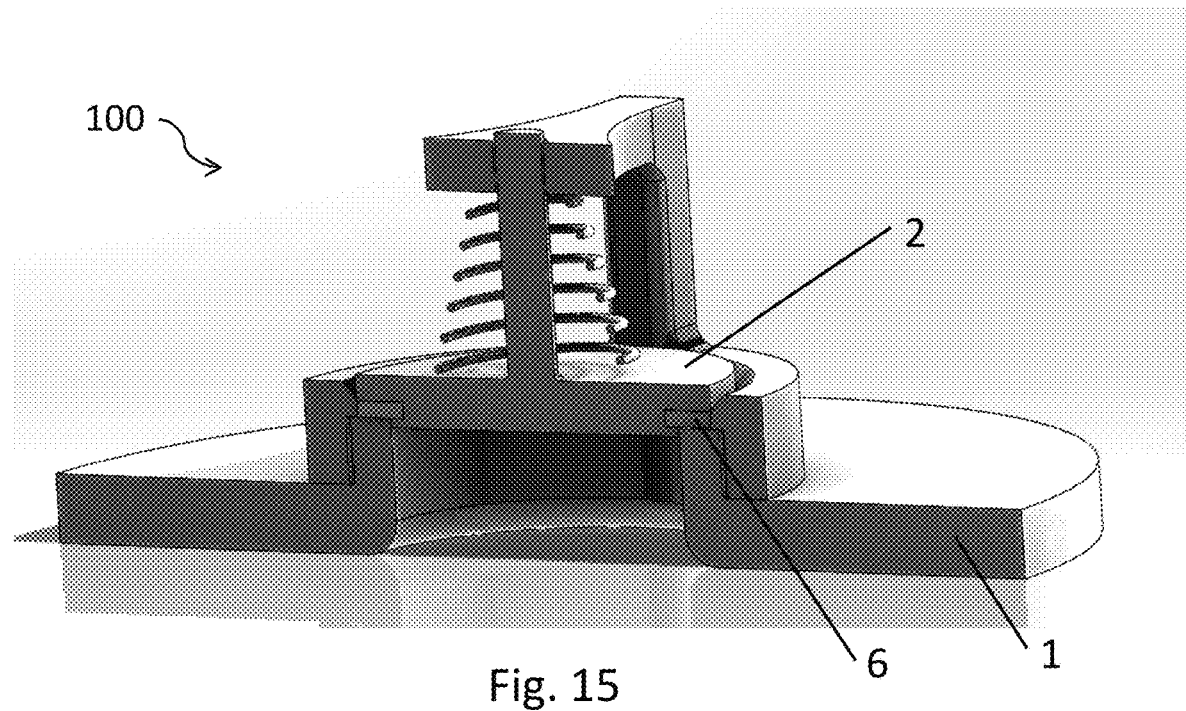
FIG. 15 is a cross-sectional view of a further embodiment of an insert check valve as disclosed herein.
Figure 16:
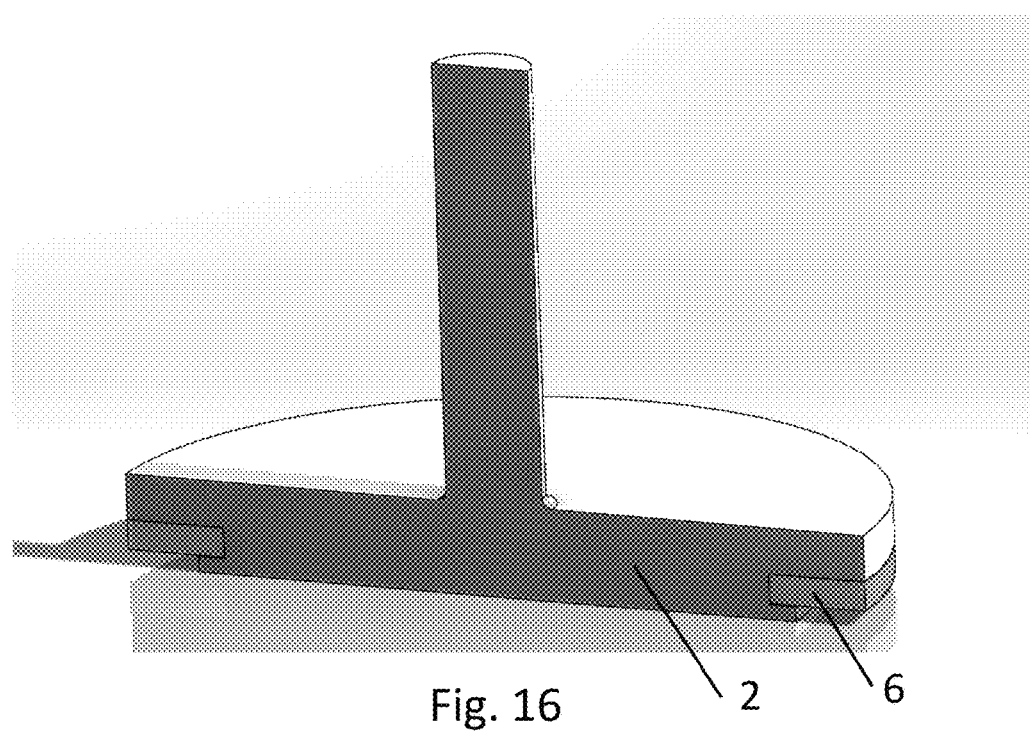
FIG. 16 is a detailed cross-sectional view of the embodiment of FIG. 15.

FIGS. 15-16 depict another embodiment of insert check valve 100, which has an optional gasket 6. Gasket 6 is arranged between disc 2, cage 3, and seat body 1. Gasket 6 can assist in providing a tight seal between the upstream side and the downstream side of insert check valve 100. As best seen in the detailed cross-section of FIG. 16, gasket 6 can be disposed in a radial groove formed on the upstream face of disc 2.

The present subject matter presented herein can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An insert check valve, comprising:
   a seat body, the seat body comprising:
   an inlet side and an outlet side;
   a central opening for fluid flow; and
   a flange surrounding the central opening on the outlet side;
   a movable disc comprising an inlet face, an outlet face, and a stem, wherein the movable disc is disposed on the outlet side of the seat body such that the inlet face can seal against the flange when the valve is closed, and wherein the stem is aligned with a longitudinal axis of the seat body;
   a cage disposed on the outlet side of the seat body, the cage comprising:
   a ring portion with an inner diameter substantially equal to an outer diameter of the flange, wherein an edge face of the ring portion is configured to mate against the outlet side of the seat body;
   a plurality of columns extending from the ring portion;

a web portion connecting the plurality of columns at an opposite end of the columns from the ring portion; and a through-hole in the web portion aligned with the longitudinal axis, wherein the through-hole is configured to receive the stem of the movable disc; and a biasing member disposed between the outlet face of the movable disc and an internal face of the web portion;

wherein each of the plurality of columns extends substantially parallel to the longitudinal axis from the ring portion, along a length of each of the plurality of columns, to a point where each column is connected to the web portion.

2. The insert check valve of claim 1, wherein the biasing member is a spring surrounding the stem.

3. The insert check valve of claim 2, wherein the biasing member is a conical compression spring.

4. The insert check valve of claim 1, wherein the cage is formed integrally as one piece.

5. The insert check valve of claim 1, wherein the seat body comprises an external circumferential recess disposed on the flange in a direction transverse to fluid flow.

6. The insert check valve of claim 5, further comprising a plurality of threaded holes disposed in an outer diameter of the ring portion and aligned with the circumferential recess.

7. The insert check valve of claim 6, further comprising a plurality of retention elements configured to connect the cage to the seat body via the threaded holes and circumferential recess.

8. The insert check valve of claim 7, wherein the retention elements comprise a set screw.

9. The insert check valve of claim 8, wherein the cage is connected to the seat body by at least three set screws.

10. The insert check valve of claim 1, wherein the cage comprises three or fewer columns.

11. The insert check valve of claim 10, wherein the columns are substantially equidistant from one another.

12. The insert check valve of claim 1, wherein the valve is configured to fit a pipe with a National Pipe Size (NPS) in a range of 1 to 6.

13. The insert check valve of claim 1, wherein the central opening of the seat body comprises a filleted or rounded edge on the inlet side.

14. The insert check valve of claim 1, wherein the ring portion of the cage further comprises an internal shoulder configured to mate with the flange.

15. The insert check valve of claim 1, wherein an outer diameter of the movable disc is substantially equal to the outer diameter of the flange.

16. The insert check valve of claim 1, wherein the valve is configured to open at a flow pressure in a range of approximately 0.25-0.6 psi.

17. The insert check valve of claim 1, wherein the web portion comprises an area less than or equal to 30% of a cross-sectional area of fluid flow.

18. The insert check valve of claim 1, wherein a sum of transverse widths of the columns is less than or equal to 17% of a circumference of the movable disc.

19. The insert check valve of claim 1, wherein a sum of transverse widths of the columns is less than or equal to 10% of a circumference of the movable disc.

20. The insert check valve of claim 1, further comprising a gasket disposed between the disc and the seat body.

21. A method of assembling an insert check valve, the method comprising:

providing a seat body, the seat body comprising:
an inlet side and an outlet side;
a central opening for fluid flow; and
a flange surrounding the central opening on the outlet side;

providing a movable disc having an inlet face, an outlet face, and a stem;

providing a cage, the cage comprising:
a ring portion with an inner diameter substantially equal to an outer diameter of the flange;
a plurality of columns extending from the ring portion;
a web portion connecting the plurality of columns at an opposite end of the columns from the ring portion; and
a central through-hole in the web portion;
wherein each of the plurality of columns extends substantially parallel to the longitudinal axis from the ring portion, along a length of each of the plurality of columns, to a point where each column is connected to the web portion;

placing the inlet face of the movable disc onto the flange of the seat body;

placing a biasing member onto the stem of the movable disc;

placing the cage over the biasing member and the disc such that the stem passes through the central through-hole;

compressing the biasing member with the disc retention cage until the edge face of the ring portion comes into contact with the outlet side of the seat body; and attaching the cage onto the flange.

22. The method of claim 21, wherein attaching the cage onto the flange comprises:

providing retention elements;
partially assembling retention elements into the cage; and
retaining the cage to the flange onto the flange via a circumferential recess in the flange.

23. A method of operating an insert check valve, the method comprising:

providing a check valve, the insert check valve comprising;
a seat body, the seat body comprising:
an inlet side and an outlet side;
a central opening for fluid flow; and
a flange surrounding the central opening on the outlet side;
a movable disc comprising an inlet face, an outlet face, and a stem, wherein the movable disc is disposed on the outlet side of the seat body such that the inlet face can seal against the flange when the valve is closed, and wherein the stem is aligned with a longitudinal axis of the seat body;
a cage disposed on the outlet side of the seat body, the cage comprising:
a ring portion with an inner diameter substantially equal to an outer diameter of the flange, wherein an edge face of the ring portion is configured to mate against the outlet side of the seat body;
a plurality of columns extending from the ring portion;
a web portion connecting the plurality of columns at an opposite end of the columns from the ring portion; and
a through-hole in the web portion aligned with the longitudinal axis, wherein the through-hole is configured to receive the stem of the movable disc;
wherein each of the plurality of columns extends substantially parallel to the longitudinal axis from the ring portion, along a length of each of the plurality of columns, to a point where each column is connected to the web portion; and a biasing member disposed between the outlet face of the movable disc and an internal face of the web portion; and moving the disc between a closed position, in which the disc is sealed against the seat body, and an open position, in which the disc is not sealed against the seat body.

24. The method of claim 23, wherein the biasing member is a conical compression spring.

* * * * *